(12) United States Patent
Wang

(10) Patent No.: US 10,452,893 B2
(45) Date of Patent: Oct. 22, 2019

(54) METHOD, TERMINAL, AND STORAGE MEDIUM FOR TRACKING FACIAL CRITICAL AREA

(71) Applicant: TENCENT TECHNOLOGY (SHENZHEN) COMPANY LIMITED, Shenzhen (CN)

(72) Inventor: Chengjie Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 74 days.

(21) Appl. No.: 15/715,398

(22) Filed: Sep. 26, 2017

(65) Prior Publication Data
US 2018/0018503 A1 Jan. 18, 2018

Related U.S. Application Data

(63) Continuation of application No. PCT/CN2016/081631, filed on May 11, 2016.

(30) Foreign Application Priority Data

Dec. 11, 2015 (CN) .......................... 2015 1 0922450

(51) Int. Cl.
*G06K 9/00* (2006.01)
(52) U.S. Cl.
CPC .......... *G06K 9/00248* (2013.01); *G06K 9/00* (2013.01); *G06K 9/00268* (2013.01); *G06K 9/00711* (2013.01)
(58) Field of Classification Search
CPC .. G06K 9/00; G06K 9/00248; G06K 9/00268; G06K 9/00711
See application file for complete search history.

(56) References Cited

U.S. PATENT DOCUMENTS 10,068,128 B2 * 9/2018 Wang ........................ G06K 9/00
2005/0281464 A1 * 12/2005 Kaku ................ G06K 9/00228
382/173

(Continued)

FOREIGN PATENT DOCUMENTS

CN 102136062 B * 4/2013
CN 103377367 A 10/2013

(Continued)

OTHER PUBLICATIONS

The World Intellectual Property Organization (WIPO) International Search Report for PCT/CN2016/081631 dated Sep. 14, 2016 5 pages (including translation).

(Continued)

*Primary Examiner* — Katrina R Fujita
(74) *Attorney, Agent, or Firm* — Anova Law Group, PLLC

(57) ABSTRACT

Method, terminal, and storage medium for tracking facial critical area are provided. The method includes accessing a frame of image in a video file; obtaining coordinate frame data of a facial part in the image; determining initial coordinate frame data of a critical area in the facial part according to the coordinate frame data of the facial part; obtaining coordinate frame data of the critical area according to the initial coordinate frame data of the critical area in the facial part; accessing an adjacent next frame of image in the video file; obtaining initial coordinate frame data of the critical area in the facial part for the adjacent next frame of image by using the coordinate frame data of the critical area in the frame; and obtaining coordinate frame data of the critical area for the adjacent next frame of image according to the initial coordinate frame data thereof.

19 Claims, 5 Drawing Sheets

(56) References Cited

U.S. PATENT DOCUMENTS

| | | | |
|---|---|---|---|
| 2006/0165286 A1* | 7/2006 | Kaku | G06K 9/00228 382/173 |
| 2007/0183654 A1* | 8/2007 | Ioffe | G06K 9/00248 382/159 |
| 2008/0187175 A1* | 8/2008 | Kim | G06K 9/00268 382/103 |
| 2009/0285457 A1* | 11/2009 | Matsuzaka | G06K 9/00248 382/118 |
| 2012/0321134 A1 | 12/2012 | Shen et al. | |
| 2013/0022243 A1* | 1/2013 | Xu | G06K 9/00228 382/103 |
| 2014/0341442 A1* | 11/2014 | Lewis | G06K 9/00248 382/118 |
| 2016/0283820 A1* | 9/2016 | Shen | G06K 9/00281 |
| 2019/0098252 A1* | 3/2019 | Tiger | H04N 5/9305 |

FOREIGN PATENT DOCUMENTS

| | | |
|---|---|---|
| CN | 103942542 A | 7/2014 |
| CN | 104361332 A | 2/2015 |
| CN | 104715227 A | 6/2015 |

OTHER PUBLICATIONS

Cao, Xudong, et al. "Face alignment by explicit shape regression." International Journal of Computer Vision 107.2 (2014): 177-190.
Viola, Paul, and Michael J. Jones. "Robust real-time face detection." International journal of computer vision 57.2 (2004): 137-154.
The State Intellectual Property Office of the People's Republic of China (SIPO) Office Action 2 for 201510922450.0 dated Mar. 18, 2019 15 Pages (including translation).

* cited by examiner

METHOD, TERMINAL, AND STORAGE MEDIUM FOR TRACKING FACIAL CRITICAL AREA

RELATED APPLICATIONS

This application is a continuation application of PCT Patent Application No. PCT/CN2016/081631, filed on May 11, 2016, which claims priority to Chinese Patent Application No. 201510922450.0, entitled "FACE KEY-POINT TRACKING METHOD AND APPARATUS" filed on Dec. 11, 2015, all of which is incorporated herein by reference in their entirety.

FIELD OF THE TECHNOLOGY

The present disclosure generally relates to the field of image processing and facial recognition, and in particular, relates to a method, apparatus, terminal, and storage medium for tracking facial critical area.

BACKGROUND OF THE DISCLOSURE

Face tracking is a process for determining a movement trajectory and size changes of a particular face in a video file or a video stream or an image sequence. Face tracking is of great significance in the fields of image analysis and image recognition. Robust adaptation and real-time of a face tracking algorithm are two indicators that are difficult to be satisfied at the same time. This may be because, with an increase in robust adaptation, complexity of the algorithm greatly increases. While being restricted by a limited processing capability of a computer, real-time of face tracking inevitably decreases.

In a video file or a video stream, to achieve a face tracking effect, face detection and facial critical area positioning need to be performed on each frame. Consequently, a face detection algorithm needs to consume plenty of time, resulting in low tracking efficiency.

SUMMARY

One aspect of the present disclosure provides a facial critical area tracking method. The method includes accessing a frame of image in a video file; obtaining coordinate frame data of a facial part in the image by detecting a position of the facial part in the frame of the image; determining initial coordinate frame data of a critical area in the facial part according to the coordinate frame data of the facial part; obtaining coordinate frame data of the critical area according to the initial coordinate frame data of the critical area in the facial part; accessing an adjacent next frame of image in the video file; obtaining initial coordinate frame data of the critical area in the facial part for the adjacent next frame of image by using the coordinate frame data of the critical area in the frame; and obtaining coordinate frame data of the critical area for the adjacent next frame of image according to the initial coordinate frame data of the critical area in the adjacent next frame of image.

Another aspect of the present disclosure provides a terminal. The terminal includes a memory, storing computer readable instructions, and a processor, coupled to the memory. The processor is configured for: accessing a frame of image in a video file; obtaining coordinate frame data of a facial part in the image by detecting a position of the facial part in the frame of the image; determining initial coordinate frame data of a critical area in the facial part according to the coordinate frame data of the facial part; obtaining coordinate frame data of the critical area according to the initial coordinate frame data of the critical area in the facial part; accessing an adjacent next frame of image in the video file; obtaining initial coordinate frame data of the critical area in the facial part for the adjacent next frame of image by using the coordinate frame data of the critical area in the frame; and obtaining coordinate frame data of the critical area for the adjacent next frame of image according to the initial coordinate frame data of the critical area in the adjacent next frame of image.

Another aspect of the present disclosure provides a non-transitory computer readable storage medium storing computer-executable instructions for, when being executed, one or more processors to perform a facial critical area tracking method. The method includes accessing a frame of image in a video file; obtaining coordinate frame data of a facial part in the image by detecting a position of the facial part in the frame of the image; determining initial coordinate frame data of a critical area in the facial part according to the coordinate frame data of the facial part; obtaining coordinate frame data of the critical area according to the initial coordinate frame data of the critical area in the facial part; accessing an adjacent next frame of image in the video file; obtaining initial coordinate frame data of the critical area in the facial part for the adjacent next frame of image by using the coordinate frame data of the critical area in the frame; and obtaining coordinate frame data of the critical area for the adjacent next frame of image according to the initial coordinate frame data of the critical area in the adjacent next frame of image.

Details of one or more embodiments of the present disclosure are provided in the accompanying drawings and description below. Other features, objectives, and advantages of the present disclosure become obvious from the specification, the accompanying drawings, and the claims.

BRIEF DESCRIPTION OF THE DRAWINGS

To more clearly describe the technical solutions in the embodiments of the present disclosure or in the prior art, the following briefly describes the accompanying drawings. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objective, technical solutions, and advantages of the present disclosure clear, the present disclosure is further described in detail with reference to the accompanying drawings and embodiments. It should be understood that, the specific embodiments described herein are merely intended to explain the present disclosure, rather than to limit the scope of the present disclosure.

Method, apparatus, terminal, and storage medium for tracking facial critical area are provided to save time for face tracking and to improve face tracking efficiency.

Figure 1:
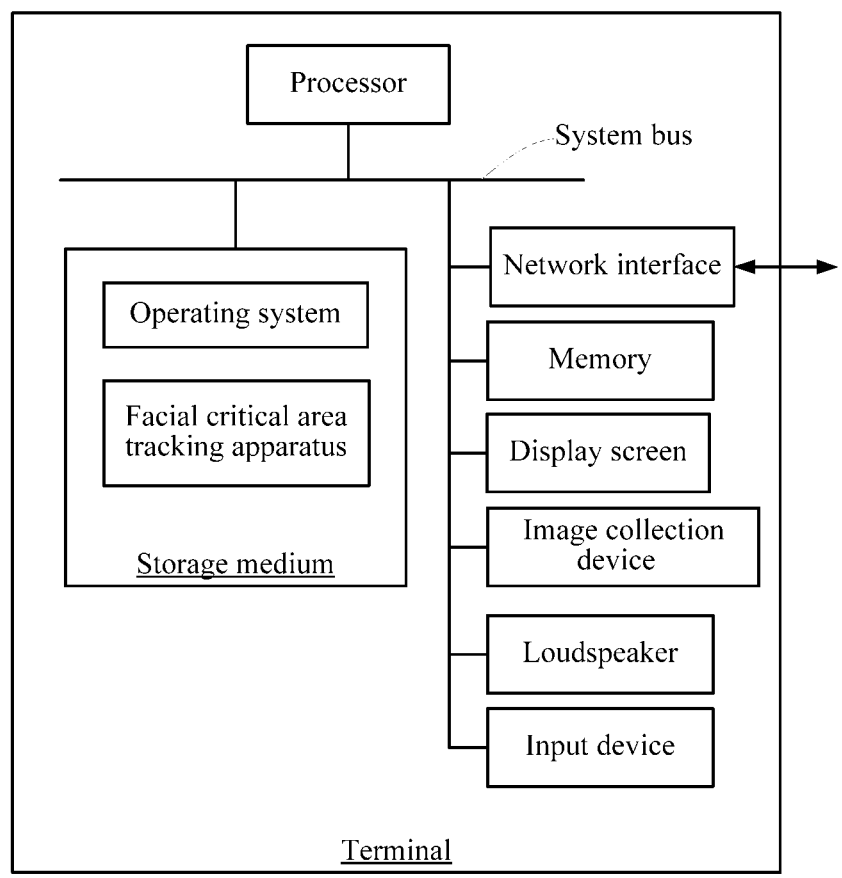
FIG. 1 is a schematic diagram of an exemplary terminal according to various embodiments of the present disclosure.

FIG. 1 is a schematic diagram of an exemplary terminal according to various embodiments of the present disclosure.

As shown in FIG. 1, the exemplary terminal includes a processor, a storage medium, a memory, a network interface, an image collection device, a display screen, a loudspeaker, and an input device, that are connected by using a system bus. The storage medium of the terminal stores an operating system, and further includes a facial critical area tracking apparatus. The facial critical area tracking apparatus is configured to implement a facial critical area tracking method. The processor is configured to provide computational and control capabilities to support operation of the entire terminal. The memory in the terminal provides an environment for running of the facial critical area tracking apparatus in the storage medium. The network interface is configured to perform network communication with a server, for example, send a video file to the server, and receive a video file returned by the server. The image collection apparatus of the terminal may collect an external image, for example, capture an image by using a camera.

The display screen may be a liquid crystal screen, an electronic ink display screen, or the like. The input device may be a touch layer covered on the display screen, or may be buttons, a trackball, or a touchpad disposed on a housing of the terminal, or may be an external keyboard, touchpad, or mouse. The terminal may be a mobile phone, a tablet computer, or a personal digital assistant. It may be understood by a person skilled in the art that, the structure shown in FIG. 1 is merely a structural block diagram of parts related to the solutions in this application, and does not form a limitation to a terminal to which the solutions in this application are applied. A specific terminal may include more or fewer components than those shown in the figure, or some components may be combined, or the terminal has a different component arrangement.

In various embodiments, the storage medium may include transitory and non-transitory, removable and non-removable media that store information such as computer readable instructions, data structures, program modules, program apparatus, or other data and that are implemented by one or more processors. The computer-readable storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. In some cases, the system memory and the storage medium depicted in FIG. 1 may be collectively referred to as memories.

In one embodiment, a non-transitory computer readable storage medium may be included in the present disclosure for storing computer-executable instructions. When the computer-executable instructions are being executed, hardware, such as one or more processors, may perform the disclosed facial critical area tracking methods.

Figure 2:
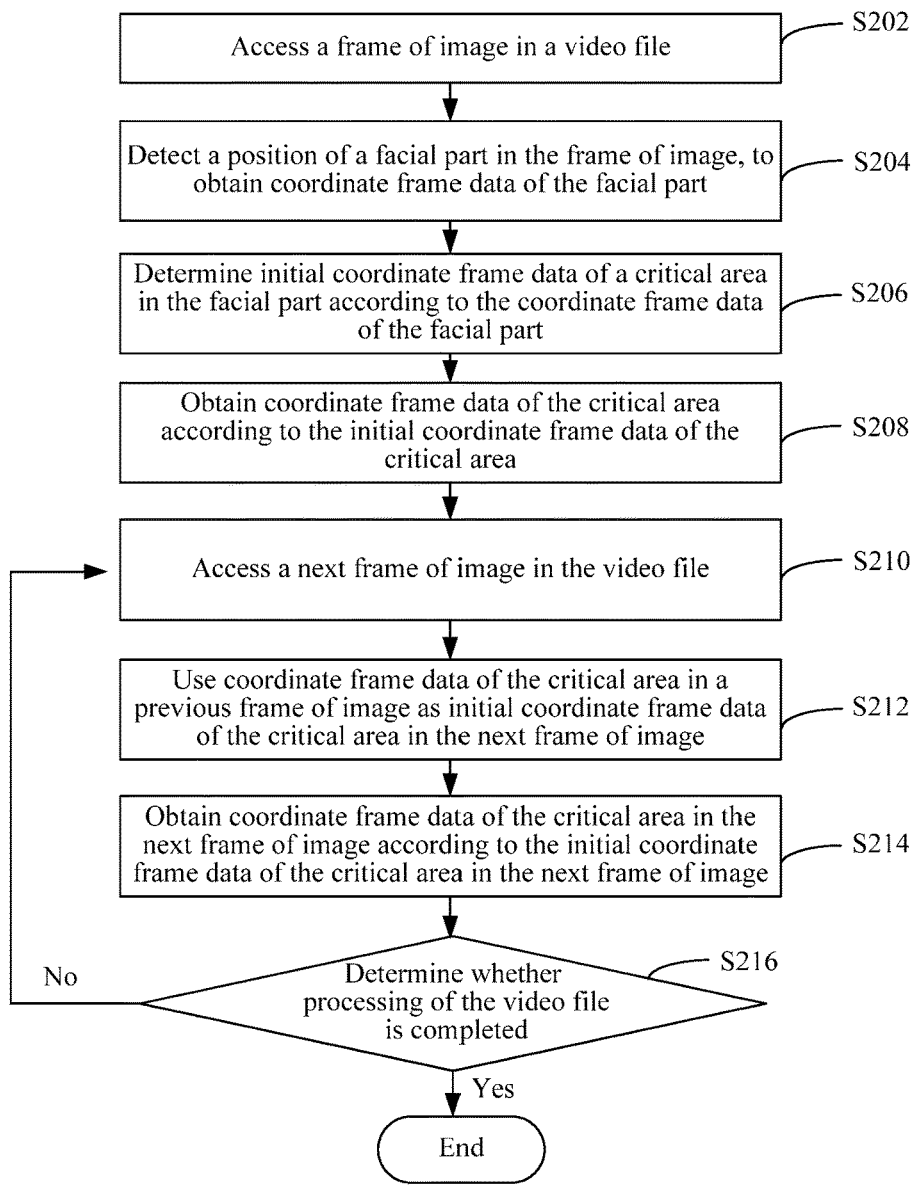
FIG. 2 is a flowchart of a facial critical area tracking method according to various embodiments of the present disclosure.

FIG. 2 is a flowchart of an exemplary facial critical area tracking method according to various embodiments of the present disclosure. As shown in FIG. 2, a facial critical area tracking method may be performed on the terminal in FIG. 1, and may include the following.

In S202, accessing a frame of image in a video file.

For example, the video file may be an online video file or a video file downloaded on the terminal. The online video file may be played while being accessed. The video file downloaded on the terminal may also be played while being accessed.

When the video file is played, video images are played one frame after another, and each frame of image may be captured for processing. First, a particular frame of image in the video file is accessed for processing. The particular frame of image may be the first frame of image in the video file, or may be another frame of image.

In various embodiments, a plurality of frames of image may be included and may form an image of the critical area of the facial part. Coordinate frame data of each of frames of image may be obtained.

In S204, detecting a position of a facial part in the frame of image, to obtain coordinate frame data of the facial part.

In one embodiment, the position of the face in the frame of image may be detected by using a face detection process, to obtain the coordinate frame data of the facial part.

For example, in the face detection process, a position of a rectangular coordinate frame of a facial part can be detected when an image including a picture of the face is input.

The face detection process may include robust real-time face detection. Face detection process can be implemented by using Haar-like features and an AdaBoost algorithm. In this process, a facial part is represented by using Haar-like features, the Haar-like features are used for training to obtain a weak classifier, and multiple weak classifiers that can best represent the face are selected by using the AdaBoost algorithm to form a strong classifier, and several strong classifiers are connected in series to form a cascaded classifier with a cascaded structure, that is, a face detector. For each Haar-like feature, face image information of a reference frame and a field frame is considered.

Face detection process may also be implemented by using Multi-scale Block based Local Binary Patterns (MBLBP) features and an AdaBoost algorithm. In this process, MBLBP features that can represent face image information of a reference frame and eight field frames are used to represent a face, and the MBLBP features are calculated by comparing an average gray level of the reference frame with respective average gray levels of the eight field frames.

Face detection process may also be implemented by using Multi-scale Structured Ordinal Features (MSOF) and an AdaBoost algorithm. In this process, MSOF features that can represent face image information of a reference frame and eight field frames are used to represent a face, distances of the eight field frames relative to the reference frame are adjustable, and the reference frame and the eight field frames may not be adjacent.

Face images and non-face images may also be collected and used as a training sample set, and Flexible Block based Local Binary Patterns (FBLBP) features of the face images and the non-face images may be extracted to form an FBLBP feature set. The FBLBP features and a GentleBoost algorithm are used for training, to obtain a first classifier. The first classifier includes several optimal second classifiers, and each optimal second classifier is obtained through training by using the GentleBoost algorithm. The first classifier is a strong classifier, and the second classifier is a weak classifier. The weak classifiers are accumulated to obtain the strong classifier. Multiple layers of first classifiers are cascaded to form a face detector. A position of the facial part in the first frame of image or another frame of image is detected by using the face detector, to obtain a coordinate frame data of the facial part.

In various embodiments, a plurality of frames of image may be included and may form an image of the critical area of the facial part. Coordinate frame data of each of frames of image may be obtained.

For coordinates of the face coordinate frame, a coordinate system is created by using a left upper corner of a screen of the terminal as a coordinate origin, and using a transverse direction as an X axis and a longitudinal direction as a Y axis. Without any limitations, the coordinate system may also be created in another self-defined manner.

In S206, determining initial coordinate frame data of a critical area in the facial part according to the coordinate frame data of the facial part.

Figure 3:
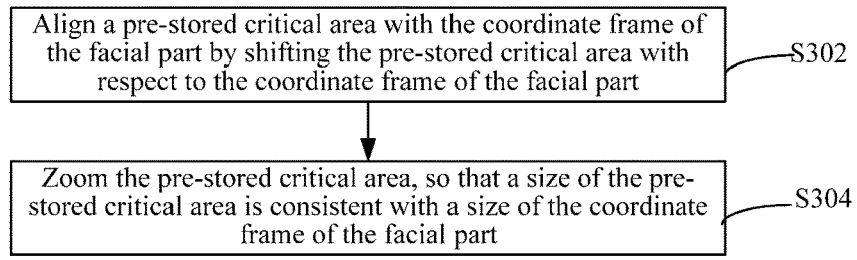
FIG. 3 is a flowchart of an exemplary process for determining initial coordinate frame data of a critical area in the facial part according to the coordinate frame data of the facial part according to various embodiments of the present disclosure.

In an embodiment, as shown in FIG. 3, the determining of initial coordinate frame data of the critical area in the facial part according to the coordinate frame data of the facial part includes the following.

In S302, aligning a pre-stored critical area with the coordinate frame of the facial part by shifting the pre-stored critical area with respect to the coordinate frame of the facial part.

For example, a center of pre-stored critical area may be aligned with a center of the coordinate frame of the facial part by translating the pre-stored critical area with respect to or over the coordinate frame of the facial part.

For example, the pre-stored critical area may have a center, and the coordinate frame of the facial part may also have a center. The center of the pre-stored critical area is coincided with the center of the coordinate frame data of the facial part. That is, the centers are aligned.

In S304, zooming the pre-stored critical area, so that a size of the pre-stored critical area is consistent with a size of the coordinate frame of the facial part.

For example, after the centers of the pre-stored critical area and the coordinate frame of the facial part are coincided, the critical area is zoomed, so that the size of critical area is substantially the same as the size of the coordinate frame of the facial part.

By translating and zooming the pre-stored critical area, the pre-stored critical area may match with the critical area in the facial part, to obtain the initial coordinate frame data of the critical area in the frame of image, bringing a small amount of computation and simple operations.

In S208, obtaining coordinate frame data of the critical area according to the initial coordinate frame data of the critical area.

In one embodiment, the coordinate frame data of the critical area may be obtained according to the initial coordinate frame data of the critical area by using a facial critical area positioning process.

For example, the facial critical area positioning process refers to obtaining coordinate frame data of the critical area when a face image and initial coordinate frame data of the critical area are input. The coordinate frame data of the critical area refer to two-dimensional coordinates of multiple points.

Facial critical area positioning process is further positioning the eyes, the eyebrows, the nose, the mouth, the outline, and the like of a facial part based on face detection, and positioning is performed by using information about positions near key points and mutual relationships among the key points. The facial critical area positioning process uses an algorithm based on regression, for example, face alignment by explicit shape regression. The face alignment by explicit shape regression uses a two-layer boosted regressor. The first layer has 10 stages, and the second layer has 500 stages. In the two-layer structure, each node in the first layer is cascading of 500 weak classifiers, that is, a regressor in the second layer. In the regressor in the second layer, features remain unchanged, and in the first layer, features change. In the first layer, an output of each node is an input of a previous node.

A fern is used as an original regressor. The fern is a combination of N features and thresholds, to divide training samples into $2^F$ bins. Each bin corresponds to one output $y_b$ that is, $$y_b = \frac{1}{1+\beta/|\Omega_b|} \frac{\sum_{i\in\Omega_b} \hat{y}_i}{|\Omega_b|},$$

where: β is an over-fitting coefficient, and $|\Omega_b|$ is a quantity of samples in the current bin. Therefore, a final output is a linear combination of all training samples. A shape index feature is further used. That is, a value of a pixel at a position of a key point is obtained according to the position of the key point and an offset, and then a difference between two such pixels is calculated, thereby obtaining a shape index feature. As such, a local coordinate system is used instead of using a global coordinate system, which greatly enhances robustness of features.

In addition, facial critical area positioning may include the following (1), (2), and/or (3).

For example, in (1), multiple positioning results are obtained for an input face image by using multiple trained positioning models. Each positioning result includes positions of multiple critical areas. The positions of the critical areas include positions of the eyes, the eyebrows, the nose, the mouth, the ears, and the outline.

Assuming that K positioning models $A_1$ to $A_K$ are used, a set of the K positioning models is represented as A. An input face image is aligned with the K positioning models, a position of a pixel in the image is represented by using (x, y), so that obtained K positioning results are respectively represented as $S_1, S_2, \ldots,$ and $S_K$. Each positioning result S includes positions of L critical areas. Therefore, S may be represented as: $S=\{x_1, y_1, x_2, y_2, \ldots, x_L, y_L\}$.

The positioning model A may be obtained through training by using a training set C ($C_1$ to $C_K$). Each training set $C_K$ has a collection of a large quantity of face image samples, and positions of L key points are marked in each face image sample $I_i$ in the training set $C_K$, that is, $S_i=\{x_{i1}, y_{i1}, x_{i2}, y_{i2}, \ldots, x_{iL}, y_{iL}\}$.

The face image samples in the training sets $C_1$ to $C_K$ may be classified into different types according to factors such as expressions, ages, races, or identities. In this way, the positioning model A may be obtained through training according to these different types.

When the positioning model A is trained, an average $S^0$, which is referred to as an average key point position, of key point positions of all samples in the training set C is first collected. |C| represents a quantity of the samples in the training set C, and the average key point position $S^0$ may be obtained by using the following equation (1):

$$S^0 = \frac{1}{|C|} \sum_{S_i \in C} S_i. \quad (1)$$

For each face image sample $I_i$ in the training set C, the average key point position $S^0$ is placed in the middle of the image, then Scale Invariant Feature Transformation (SIFT) features of key point positions for the average key point position $S^0$ are extracted, and the extracted SIFT features are spliced to form a feature vector $f_i$. In this way, a regression model may be created according to all the sample images in the training set C, so that equation (2) is obtained as follows.

$$f_i \cdot A = S_i - S^0 \quad (2).$$

For each input face image that needs to be positioned, first the average key point position $S^0$ is placed in the middle of the input image, and SIFT features of key point positions for $S^0$ are extracted and spliced to form a feature vector f. A positioning result set S including the K positioning results may be obtained by using the following equation (3).

$$S = S^0 + f \cdot A \quad (3).$$

As such, multiple positioning results related to the key point positions of the input image may be obtained from the multiple trained positioning models.

For facial critical area positioning, in (2), the obtained multiple positioning results are evaluated, to select an optimal positioning result from the multiple positioning results.

Positions of L key points are marked in a face image sample $I_i$ in the training set C, that is, $S_i=\{x_{i1}, y_{i1}, x_{i2}, y_{i2}, \ldots x_{iL}, y_{iL}\}$. One Boost classifier may be trained for each key point, so that L classifiers $h_1, h_2, \ldots, h_L$ may be obtained. The L classifiers may form an evaluation model E.

When a classifier is trained, the key point classifier may be trained by using image blocks in face images of the training set C that are sufficiently close to a position of a key point (for example, distances between central positions of the image blocks and the position of the key point fall within a first preset distance) as positive samples, and using image blocks that are sufficiently far from the position of the key point (for example, distances between central positions of the image blocks and the position of the key point exceed a second preset distance) as negative samples.

When a key point positioning result $S_i$ is evaluated, image blocks with a preset size centering on each key point position $(x_j, y_j)$ are input to a corresponding key point classifier $h_j$, so as to obtain a score $h_j(x_j, y_j)$. Thereby, scores of all key point classifiers for this key point positioning result $S_j$ may be obtained, and then an average score of the positioning result is obtained as shown in equation (4).

$$\text{score}(S_k) = \frac{1}{L} \sum_{j=1}^{L} h_j(x_{kj}, y_{kj}). \quad (4)$$

A score of each of K positioning results $S_1, S_2, \ldots,$ and $S_K$ may be obtained, and an optimal positioning result $S^*$, that is, a positioning result having a highest score, is selected as a final positioning result of positions of critical areas.

For facial critical area positioning, in (3), when the score of the obtained optimal positioning result $S^*$ is greater than a preset threshold T, an evaluation model and/or a positioning model may be updated according to the optimal positioning result.

For example, when the evaluation model is updated, an input image corresponding to the positioning result $S^*$ may be added to the training set C, positions of L key points corresponding to the positioning result $S^*$ are used to generate a preset quantity of positive sample image blocks and negative sample image blocks, and then the generated positive sample image blocks and negative sample image blocks are used to train the classifiers $h_1, h_2, \ldots,$ and $h_L$ of the L key points, so as to update the evaluation model E. For example, the key point classifiers $h_1, h_2, \ldots,$ and $h_L$ may be trained by using an online AdaBoost method.

When the positioning model is updated and when it is determined that the new positioning result $S^*$ exceeding the preset threshold exists, a type of a positioning model corresponding to the positioning result $S^*$ is determined. For example, the type of the $S^*$ may be searched for by using an online K mean method based on a SIFT feature vector f corresponding to the positioning result $S^*$. If it is determined that $S^*$ belongs to a particular type $A_k$ in the currently existing K positioning models, $S^*$ is added to the training set $C_k$ corresponding to $A_k$, and the positioning model $A_k$ is trained again by using the method for training a positioning model described above, so as to update the positioning model $A_k$.

If it is determined that $S^*$ does not belong to any type in the currently existing K types of positioning models, a corresponding training set $C_{K+1}$ is created. When a quantity of samples in the newly added training set $C_{K+1}$ exceeds a threshold, the training set $C_{K+1}$ is used to train a new positioning model $A_{K+1}$. In this way, the existing K positioning models may be increased to K+1 positioning models. After the positioning models are increased, positioning results increases from the original K positioning results to K+1 positioning results.

A matrix formed by all sample feature vectors f of the sample pictures in the training set C is represented by F, and the $i^{th}$ row of F represents a feature vector the $i^{th}$ sample. A matrix formed by manually marked key point positions in the training set C is represented by S, and the $i^{th}$ row of S represents key point positions of the $i^{th}$ sample. A matrix formed by average key point positions of all the samples in the training set C is represented by $S^0$, and the $i^{th}$ row of $S^0$ represents an average key point position of the $i^{th}$ sample. The existing positioning model A before update satisfies the following equation:

$$F \cdot A = S - S^0.$$

where A may be solved in a least square manner:

$$A = (F^T F)^{-1} \cdot F \cdot (S - S^0).$$

Covariance matrices are:

$$Cov_{xx} = F^T F,$$

and $$Cov_{xy} = F \cdot (S - S^0).$$

Elements in the $m^{th}$ row and the $n^{th}$ column of $Cov_{xx}$ and $Cov_{xy}$ may be represented as:

$$Cov_{xx}(m, n) = \sum_{S_i \in C} f_{im} f_{in}(m, n), \text{ and}$$

$$Cov_{xy}(m, n) = \sum_{S_i \in C} f_{im}(\text{Sin} - S_{in}^0).$$

where $f_{in}$ represents a value of the $m^{th}$ dimension of the feature vector of the $i^{th}$ sample in the training set C, Sin represents a value of the $n^{th}$ dimension of the manually marked key point positions of the $i^{th}$ sample in the training set C, and $S_{in}^0$ represents a value of the $n^{th}$ dimension of the average key point position of the $i^{th}$ sample in the training set C.

When the sample s* is newly added, elements of the covariance matrices may be updated as the following equations:

$$Cov_{xx}(m, n) = \sum_{S_i \in C} f_{im} f_{in} + f_m^* f_n^*, \text{ and}$$

$$Cov_{xy}(m, n) = \sum_{S_i \in C} f_{im}(\text{Sin} - S_{in}^0) + f_m^*(S_n^* - S_n^{*0}).$$

where $f^*_m$ represents a value of the $m^{th}$ dimension of a feature vector of the newly added sample, $S^*_n$ represents a value of the $n^{th}$ dimension of manually marked key point positions of the newly added sample, and $S^*_n{}^0$ represents a value of the $n^{th}$ dimension of an average key point position of the newly added sample.

The coordinate frame data of the critical area are obtained according to the initial coordinate frame data of the critical area by using the foregoing facial critical area positioning process.

In S210, accessing a next frame of image in the video file.

For example, a next frame of image adjacent to a previous processed frame of image in the video file is access.

In S212, using coordinate frame data of the critical area in a previous frame of image as initial coordinate frame data of the critical area in the next frame of image.

In S214, obtaining coordinate frame data of the critical area in the next frame of image according to the initial coordinate frame data of the critical area in the next frame of image.

As such, the coordinate frame data of the critical area in the next frame of image may be obtained according to the initial coordinate frame data of the critical area in the next frame of image by using a facial critical area positioning process.

In S216, determining whether processing of the video file is completed, if the processing of the video file is completed, the method ends, otherwise, return to S210.

For example, S210 to S214 may be repeatedly performed, until an application exits or the processing of the video file is completed.

The critical areas include points of five facial features. The points of five facial features include the eyes, the eyebrows, the nose, the mouth, and the ears. By using the points of five facial features for tracking, the computation amount is small, and tracking efficiency can be improved.

By means of the disclosed facial critical area tracking method, initial coordinate frame data of critical area are configured by using a coordinate frame data of the facial part, and then coordinate frame data of the critical area are obtained according to the initial coordinate frame data of the critical area; and an adjacent next frame of image is access, the coordinate frame data of the critical area in the previous frame of image are used as initial coordinate frame data of the critical area in the next frame of image, to obtain coordinate frame data of the critical area in the next frame of image. In this manner, detection of a face detector is skipped, and efficiency of tracking of critical areas can be improved.

In addition, because a data processing capability of a mobile terminal is limited, by using the disclosed facial critical area tracking method, a large amount of computation can be avoided, thereby facilitating the mobile terminal to rapidly track a face, and improving efficiency of tracking of critical areas.

In an embodiment, in the disclosed facial critical area tracking method, denoising processing may be performed, after a frame of image or an adjacent next frame of image in the video file is access, denoising processing on a frame of image that has been access. Clarity of the image is improved by using denoising processing, thereby facilitating more accurate tracking of the face.

For example, denoising processing may be performed on a access frame of image by using a weighted averaging method. That is, all pixels in the image are processed by means of weighted averaging.

Figure 4:
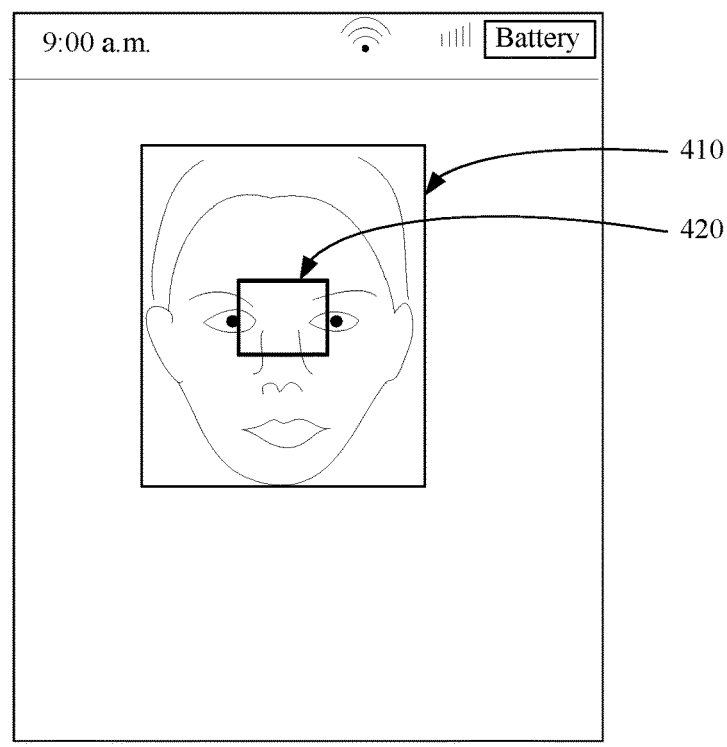
FIG. 4 is a schematic diagram of an exemplary process for aligning a critical area with a coordinate frame of a facial part according to various embodiments of the present disclosure.
Figure 5:
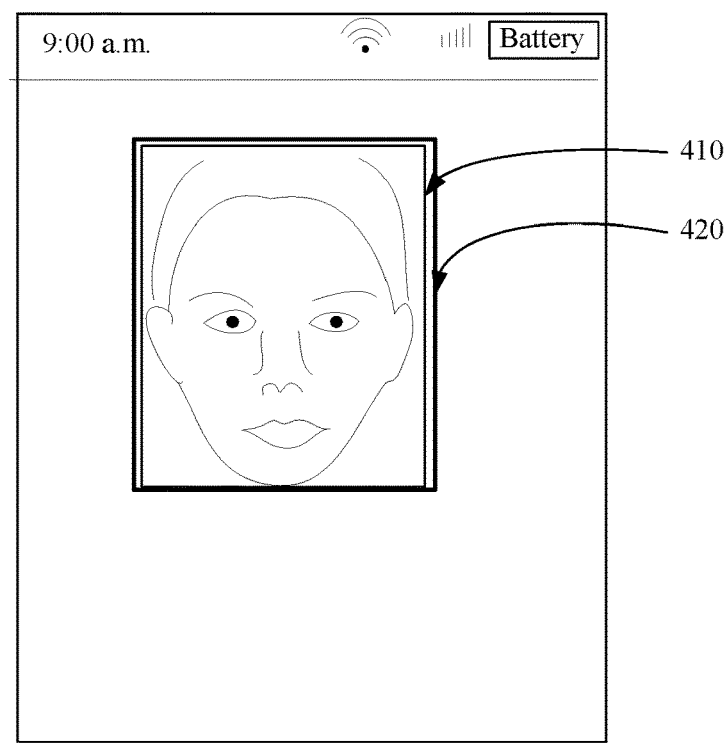
FIG. 5 is a schematic diagram of an exemplary process for zooming critical area according to various embodiments of the present disclosure.
Figure 6:
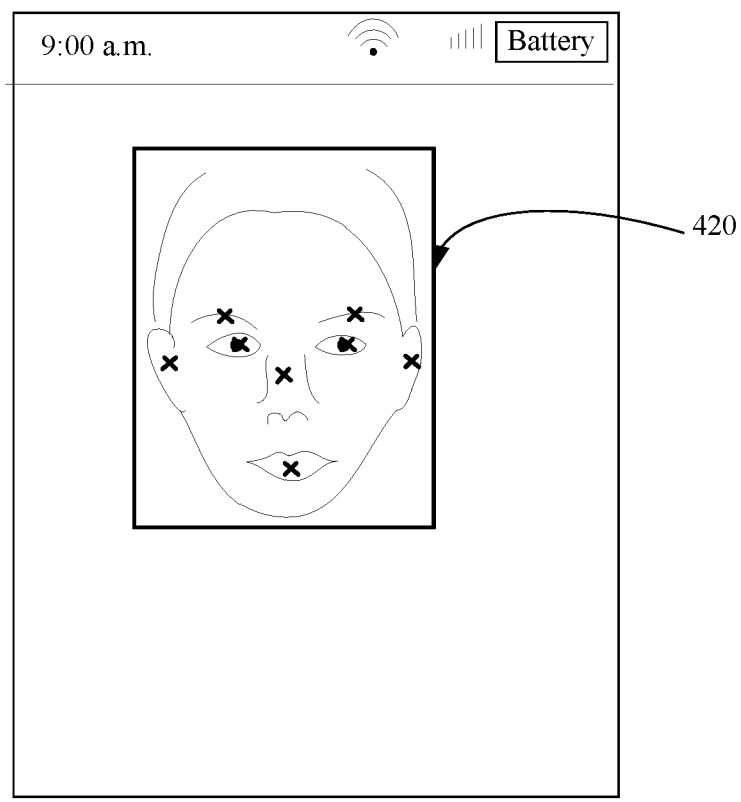
FIG. 6 is a schematic diagram of an exemplary process for obtaining positions of coordinates of points of five facial features according to various embodiments of the present disclosure.

An implementation process of the facial critical area tracking method is described below in combination with a specific application scenario. An example in which critical areas are points of five facial features is used. As shown in FIG. 4, a frame of image in a video file is accessed, a position of a facial part in the frame of image is detected, a position 410 of coordinate frame of a facial part is obtained, and a center of pre-stored critical area 420 is aligned with a center of the position 410 of the coordinate frame of the facial part. As shown in FIG. 5, after the center of the pre-stored critical area 420 is aligned with the center of the position 410 of the coordinate frame of the facial part, the pre-stored critical area 420 is zoomed, so that a size of the critical area is the same as a size of the coordinate frame of the facial part, thereby obtaining initial coordinate frame data of the critical area. As shown in FIG. 6, coordinate frame data of the critical areas, that is, coordinate positions of the points of five facial features, as shown by cross points "x" in FIG. 6, are obtained according to the initial coordinate frame data of the critical areas. Then an adjacent next frame of image in the video file is access. The coordinate frame data of the critical areas in the previous frame of image are used as initial coordinate frame data of the critical areas in the next frame of image. Coordinate frame data of the critical areas in the next frame of image are obtained according to the initial coordinate frame data of the critical areas in the next frame of image.

Figure 7:
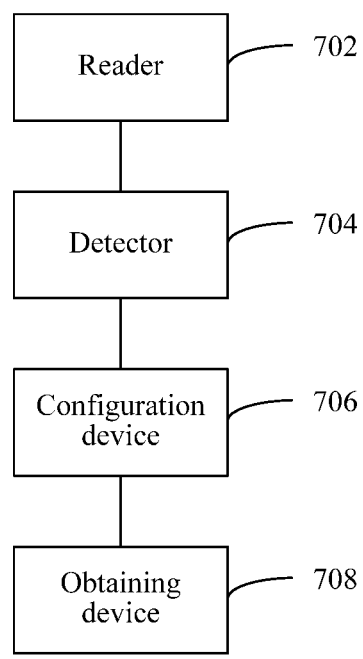
FIG. 7 is a structural block diagram of an exemplary facial critical area tracking apparatus according to various embodiments of the present disclosure.

FIG. 7 is a structural block diagram of an exemplary facial critical area tracking apparatus according to various embodiments of present disclosure. As shown in FIG. 7, a facial critical area tracking apparatus runs on a terminal, and includes a reader 702, a detector 704, a configuration device 706, and an obtaining device 708.

The reader 702 is configured to access a frame of image in a video file.

For example, the video file may be an on-line video file or a video file downloaded on the terminal. The online video file may be played while being access. The video file downloaded on the terminal may also be played while being access.

The detector 704 is configured to detect a position of a facial part in the frame of image, to obtain a coordinate frame data of the facial part.

In one embodiment, the detector 704 detects the position of the face in the frame of image by using a face detection process, to obtain the coordinate frame data of the facial part.

For example, in the face detection process, a position of a rectangular coordinate frame of a facial part can be detected when an image including a picture of the face is input.

The configuration device 706 is configured to configure initial coordinate frame data of the critical area in the facial part according to the coordinate frame data of the facial part.

In one embodiment, the configuration device 706 is further configured to: align a center of pre-stored critical area with a center of the coordinate frame of the facial part by translating the pre-stored critical area; and zoom the pre-stored critical area, so that a size of the pre-stored critical area is consistent with a size of the coordinate frame of the facial part.

For example, the pre-stored critical area has a center, and the coordinate frame data of the facial part also has a center. The center of the pre-stored critical area is coincided with the center of the coordinate frame data of the facial part. That is, the centers are aligned with each other. After the centers of the pre-stored critical area and the coordinate frame of the facial part are coincided, the critical area is zoomed, so that the size of critical area is the same as the size of the coordinate frame of the facial part. By translating and zooming the critical area, the pre-stored critical area may match with the position of the critical area of the facial part, to obtain the initial coordinate frame data of the critical area in the frame of image, providing a small computation amount and simple operations.

The obtaining device 708 is configured to obtain coordinate frame data of the critical areas according to the initial coordinate frame data of the critical areas.

In one embodiment, the obtaining device 708 is further configured to obtain the coordinate frame data of the critical areas according to the initial coordinate frame data of the critical areas by using a facial critical area positioning process.

For example, the facial critical area positioning process may include obtaining coordinate frame data of the critical areas when a face image and initial coordinate frame data of the critical areas are input. The coordinate frame data of the critical area refer to two-dimensional coordinates of multiple points.

The following process is repeatedly performed.

The reader 702 is further configured to access an adjacent next frame of image in the video file.

For example, the next frame of image adjacent to a previous processed frame of image in the video file is access.

The configuration device 706 is further configured to use coordinate frame data of the critical areas in a previous frame of image as initial coordinate frame data of the critical areas in the adjacent next frame of image.

The obtaining device 708 is further configured to obtain coordinate frame data of the critical areas in the adjacent next frame of image according to the initial coordinate frame data of the critical areas in the adjacent next frame of image.

In one embodiment, the obtaining device 708 is further configured to obtain the coordinate frame data of the critical areas in the adjacent next frame of image according to the initial coordinate frame data of the critical areas in the adjacent next frame of image by using a facial critical area positioning process.

The foregoing process is repeatedly performed, until an application exits or processing of the video file is completed.

The critical area may include, for example, five facial features. The five facial features include the eyes, the eyebrows, the nose, the mouth, and the ears. By using the five facial features for tracking, a computation amount is small, and tracking efficiency can be improved. Although any number of facial features may be selected and used in the present disclosure for the facial critical area tracking.

In the disclosed facial critical area tracking apparatus, initial coordinate frame data of the critical area in the facial part are configured by using a coordinate frame data of the facial part, and then coordinate frame data of the critical areas are obtained according to the initial coordinate frame data of the critical areas; and an adjacent next frame of image is accessed, the coordinate frame data of the critical areas in the previous frame of image are used as initial coordinate frame data of the critical areas in the adjacent next frame of image, to obtain coordinate frame data of the critical areas in the adjacent next frame of image. In this way, detection of a face detector is skipped, and efficiency of tracking of critical area can be improved.

Figure 8:
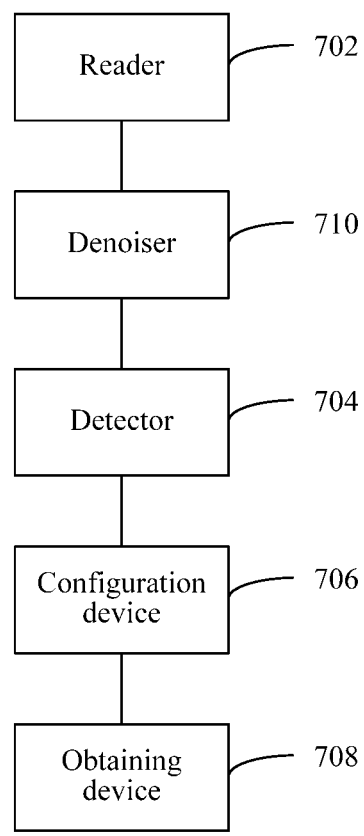
FIG. 8 is a structural block diagram of another exemplary facial critical area tracking apparatus according to various embodiments of the present disclosure.

FIG. 8 is a structural block diagram of another exemplary facial critical area tracking apparatus according to various embodiments of the present disclosure. As shown in FIG. 8, a facial critical area tracking apparatus runs on a terminal, and in addition to the reader 702, the detector 704, the configuration device 706, and the obtaining device 708, the apparatus further includes a denoiser 710.

The denoiser 710 is configured to perform, after a frame of image or an adjacent next frame of image in the video file is accessed, denoising processing on a frame of image that has been accessed. Clarity of the image is improved by using denoising processing, thereby facilitating more accurate tracking of the facial critical area.

For example, denoising processing may be performed on an accessed frame of image by using a weighted averaging method. That is, all pixels in the image are processed by means of weighted averaging.

A person of ordinary skill in the art may understand that all or some of the processes in the foregoing embodiments may be implemented by a computer program instructing relevant hardware. The program may be stored in a non-transitory computer readable storage medium. When the program is executed, the processes in the foregoing embodiments of the methods may be performed. The storage medium may be a magnetic disk, an optical disc, a read-only memory (ROM), or the like.

The embodiments described above merely explain some implementations of the present disclosure. Though the descriptions are specific and detailed, the embodiments should not thereby be understood as limitations to the patentable scope of the present disclosure. It should be noted that, without departing from the concepts of the present disclosure, a person of ordinary skill in the art may still make several variations and improvements, all of which shall fall within the protection scope of the present disclosure. Therefore, the protection scope of the present disclosure shall subject to the accompanying claims.

What is claimed is:

1. A facial critical area tracking method, comprising:
accessing a frame of image in a video file;
obtaining a first coordinate frame data of a facial part in the image by detecting a position of the facial part in the frame of the image;
determining a first initial coordinate frame data of a critical area in the facial part according to the first coordinate frame data of the facial part, comprising:
aligning a center of a pre-stored critical area with a center of a coordinate frame of the facial part by shifting the pre-stored critical area with respect to the coordinate frame of the facial part; and
zooming a size of the pre-stored critical area to match a size of the coordinate frame of the facial part, so that the zoomed size of the pre-stored critical area is the same as the size of the coordinate frame of the facial part;
obtaining a second coordinate frame data of the critical area according to the first initial coordinate frame data of the critical area in the facial part;
accessing an adjacent next frame of image in the video file;
obtaining a second initial coordinate frame data of the critical area in the facial part for the adjacent next frame of image by using the second coordinate frame data of the critical area in the frame; and
obtaining a third coordinate frame data of the critical area for the adjacent next frame of image according to the second initial coordinate frame data of the critical area in the adjacent next frame of image.

2. The method according to claim 1, further including:
obtaining the third coordinate frame data of each of a plurality of frames of image, wherein the plurality of frames form an image of the critical area of the facial part.

3. The method according to claim 1, wherein the step of detecting a position of a facial part in the frame of image is implemented by using an AdaBoost algorithm in combination with one of Haar-like features, Multi-scale Block based Local Binary Patterns (MBLBP) features, and Multi-scale Structured Ordinal Features (MSOF).

4. The method according to claim 1, wherein:
the first coordinate frame data, the second coordinate frame data and the third coordinate frame data of the critical area further include two-dimensional coordinates of multiple points of the critical area; and
the first coordinate frame data, the second coordinate frame data and the third coordinate frame data of the critical area are obtained using information about coordinate frame data near the critical area and mutual relationships among critical areas.

5. The method according to claim 1, wherein the critical area includes a facial feature, including at least one of eyes, eyebrows, nose, mouth, and ears.

6. The method according to claim 1, further comprising:
performing a denoising process while accessing each of the frame of image and the adjacent next frame of image.

7. The method according to claim 1, wherein obtaining the second coordinate frame data of the critical area according to the first initial coordinate frame data of the critical area in the facial part, comprises:
performing a face alignment by explicit shape regression using a two-layer boosted regressor.

8. The method according to claim 7, wherein the two-layer boosted regressor comprises a first layer having N1 stages and a second layer having N2 stages, wherein each node in the first layer is cascading of N2 classifiers in the second layer, and N1 and N2 are integers greater than 3.

9. A terminal, comprising:
a memory, storing computer readable instructions, and
a processor, coupled to the memory and configured for:
accessing a frame of image in a video file;
obtaining a first coordinate frame data of a facial part in the image by detecting a position of the facial part in the frame of the image;
determining a first initial coordinate frame data of a critical area in the facial part according to the first coordinate frame data of the facial part, comprising:
aligning a center of a pre-stored critical area with a center of a coordinate frame of the facial part by shifting the pre-stored critical area with respect to the coordinate frame of the facial part; and
zooming a size of the pre-stored critical area to match a size of the coordinate frame of the facial part, so that the zoomed size of the pre-stored critical area is the same as the size of the coordinate frame of the facial part;
obtaining a second coordinate frame data of the critical area according to the first initial coordinate frame data of the critical area in the facial part;
accessing an adjacent next frame of image in the video file;
obtaining a second initial coordinate frame data of the critical area in the facial part for the adjacent next frame of image by using the second coordinate frame data of the critical area in the frame; and
obtaining a third coordinate frame data of the critical area for the adjacent next frame of image according to the second initial coordinate frame data of the critical area in the adjacent next frame of image.

10. The terminal according to claim 9, wherein the processor is further configured for:
obtaining the third coordinate frame data of each of a plurality of frames of image, wherein the plurality of frames form an image of the critical area of the facial part.

11. The terminal according to claim 9, wherein the processor is further configured for:
detecting the position of the facial part in the frame of image by using an AdaBoost algorithm in combination with one of Haar-like features, Multi-scale Block based Local Binary Patterns (MBLBP) features, and Multi-scale Structured Ordinal Features (MSOF).

12. The terminal according to claim 9, wherein:
the first coordinate frame data, the second coordinate frame data and the third coordinate frame data of the critical area further include two-dimensional coordinates of multiple points of the critical area; and
the first coordinate frame data, the second coordinate frame data and the third coordinate frame data of the critical area are obtained using information about coordinate frame data near the critical area and mutual relationships among critical areas.

13. The terminal according to claim 9, wherein the critical area includes a facial feature, including at least one of eyes, eyebrows, nose, mouth, and ears.

14. The terminal according to claim 9, wherein the processor is further configured for:

performing a denoising process while accessing each of the frame of image and the adjacent next frame of image.

15. A non-transitory computer readable storage medium storing computer-executable instructions for, when being executed, one or more processors to perform a facial critical area tracking method, the method comprising:
accessing a frame of image in a video file;
obtaining a first coordinate frame data of a facial part in the image by detecting a position of the facial part in the frame of the image;
determining a first initial coordinate frame data of a critical area in the facial part according to the first coordinate frame data of the facial part, comprising:
aligning a center of a pre-stored critical area with a center of a coordinate frame of the facial part by shifting the pre-stored critical area with respect to the coordinate frame of the facial part; and
zooming a size of the pre-stored critical area to match a size of the coordinate frame of the facial part, so that the zoomed size of the pre-stored critical area is the same as the size of the coordinate frame of the facial part;
obtaining a second coordinate frame data of the critical area according to the first initial coordinate frame data of the critical area in the facial part;
accessing an adjacent next frame of image in the video file;
obtaining a second initial coordinate frame data of the critical area in the facial part for the adjacent next frame of image by using the second coordinate frame data of the critical area in the frame; and
obtaining a third coordinate frame data of the critical area for the adjacent next frame of image according to the second initial coordinate frame data of the critical area in the adjacent next frame of image.

16. The non-transitory computer readable storage medium according to claim 15, wherein the one or more processors are further configured for:
obtaining the third coordinate frame data of each of a plurality of frames of image, wherein the plurality of frames form an image of the critical area of the facial part.

17. The non-transitory computer readable storage medium according to claim 15, wherein the one or more processors are further configured for:
detecting the position of the facial part in the frame of image by using an AdaBoost algorithm in combination with one of Haar-like features, Multi-scale Block based Local Binary Patterns (MBLBP) features, and Multi-scale Structured Ordinal Features (MSOF).

18. The non-transitory computer readable storage medium according to claim 15, wherein:
the first coordinate frame data, the second coordinate frame data and the third coordinate frame data of the critical area further include two-dimensional coordinates of multiple points of the critical area; and
the first coordinate frame data, the second coordinate frame data and the third coordinate frame data of the critical area are obtained using information about coordinate frame data near the critical area and mutual relationships among critical areas.

19. The non-transitory computer readable storage medium according to claim 15, wherein the one or more processors are further configured for:
performing a denoising process while accessing each of the frame of image and the adjacent next frame of image.

* * * * *